(12) United States Patent
Yang

(10) Patent No.: US 6,402,420 B1
(45) Date of Patent: Jun. 11, 2002

(54) CONNECTOR FOR KNOCKDOWN FURNITURE

(76) Inventor: Hsin Chen Yang, 423 Section 2, Tou Yuan Road, Pei Tou Township, Chan Hua Hsien (TW)

( * ) Notice: Subject to any disclaimer, the term of this patent is extended or adjusted under 35 U.S.C. 154(b) by 35 days.

(21) Appl. No.: 09/610,604

(22) Filed: Jul. 5, 2000

(51) Int. Cl.[7] ........................... F16B 12/00; F16B 13/00; F04H 12/00
(52) U.S. Cl. .................... 403/381; 103/254; 103/322.1; 103/187; 103/170; 52/656.9; 52/655.1
(58) Field of Search ................................ 403/252, 254, 403/255, 257, 322.1, 187, 170, 174, 178; 52/655.1, 656.9

(56) References Cited

U.S. PATENT DOCUMENTS

| | | | | |
|---|---|---|---|---|
| 4,101,231 A | * | 7/1978 | Streib | |
| 4,142,810 A | * | 3/1979 | Lesaint | ....................... 403/252 |
| 4,262,461 A | * | 4/1981 | Johnson et al. | |
| 4,345,849 A | * | 8/1982 | Stenemann | |
| 4,799,819 A | * | 1/1989 | Swoboda | |

* cited by examiner

Primary Examiner—Lynne H. Browne
Assistant Examiner—Tomlyne A Malcolm
(74) Attorney, Agent, or Firm—Rabin & Berdo, P.C.

(57) ABSTRACT

The present invention is directed toward a connector for knockdown furniture. The connector includes a hollow connecting block having an aperture at both ends of the connecting block. The aperture at the front end is for riveting a rod. The connecting block further includes a hole on both lateral sides. A pressing bracket is inside the connecting block, and has a diminishing opening at its front end. The front edge is pivoted outward to form a suppressing surface having a plurality of serrations and having a hole at the rear end. A locking member has an eccentric axle that passes through the aperture on the connecting block and the hole on the pressing bracket and rivets the front end of the pressing bracket to the connecting block. A rod is pivoted in the front end of the connecting block and is deposed at the back end of the diminishing opening of the pressing bracket.

4 Claims, 13 Drawing Sheets

CONNECTOR FOR KNOCKDOWN FURNITURE

BACKGROUND OF THE INVENTION

1. Field of the Invention

The present invention relates to a connector, more particularly to a knockdown furniture connector capable of adjusting the height of its connection position.

2. Description of the Prior Art

Conventional or prior art knockdown furniture usually connects the supporting framework tube with the layer boards or racks by screws fixing, therefore once the layer board or rack is fixed, we are not able to adjust the height of the layer board any more. Connectors of this kind are not convenient at all. Furthermore, there are furniture with adjustable layer boards or racks sold in the market, and when the heights of these layer boards or racks are being adjusted, the users need to uninstall the layer board or rack first, then adjust the height, and finally re-install the layer board or rack back to the position of the desired height. Such operation for adjusting the height of the layer board or rack is also inconvenient.

In view of the above-mentioned shortcomings of the prior art, the inventor of the present invention based on years of experience accumulated from the engagement in the related industry conducted extensive research to resolve the foregoing shortcomings.

Therefore, the primary objective of the invention is to overcome the shortcomings of the conventional connectors and to provide users a more convenient and quicker way to adjust the height of the layer board of the knockdown furniture. The space for adjusting the position of the layer board will not have that much restriction, which makes the adjustment much easier and more convenient. It makes the assembling or the adjustment more flexible and gives a more useful and practical effect.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
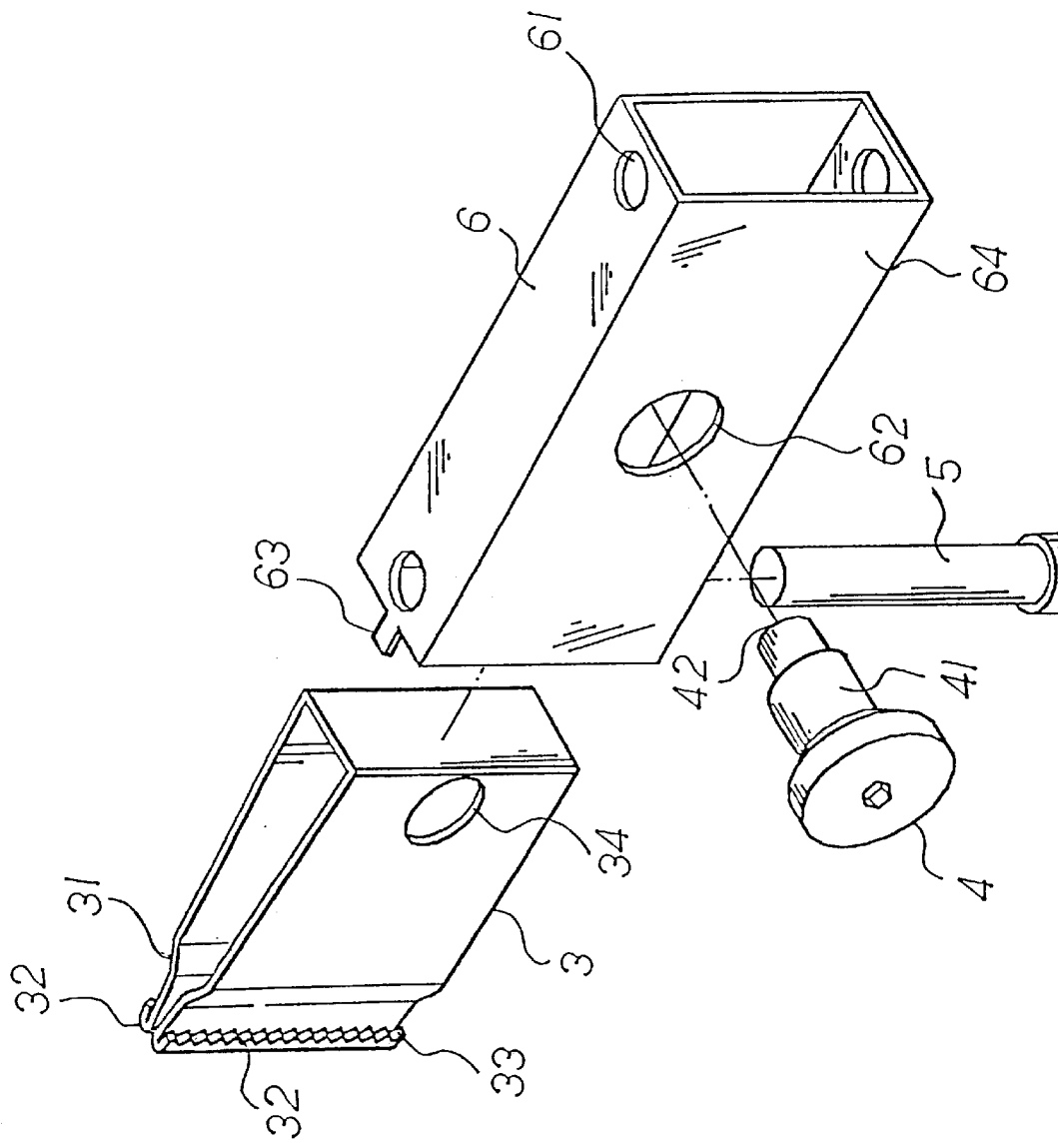
FIG. 1 shows the three-dimensional diagram of the disassembled parts of the present invention.
Figure 2:
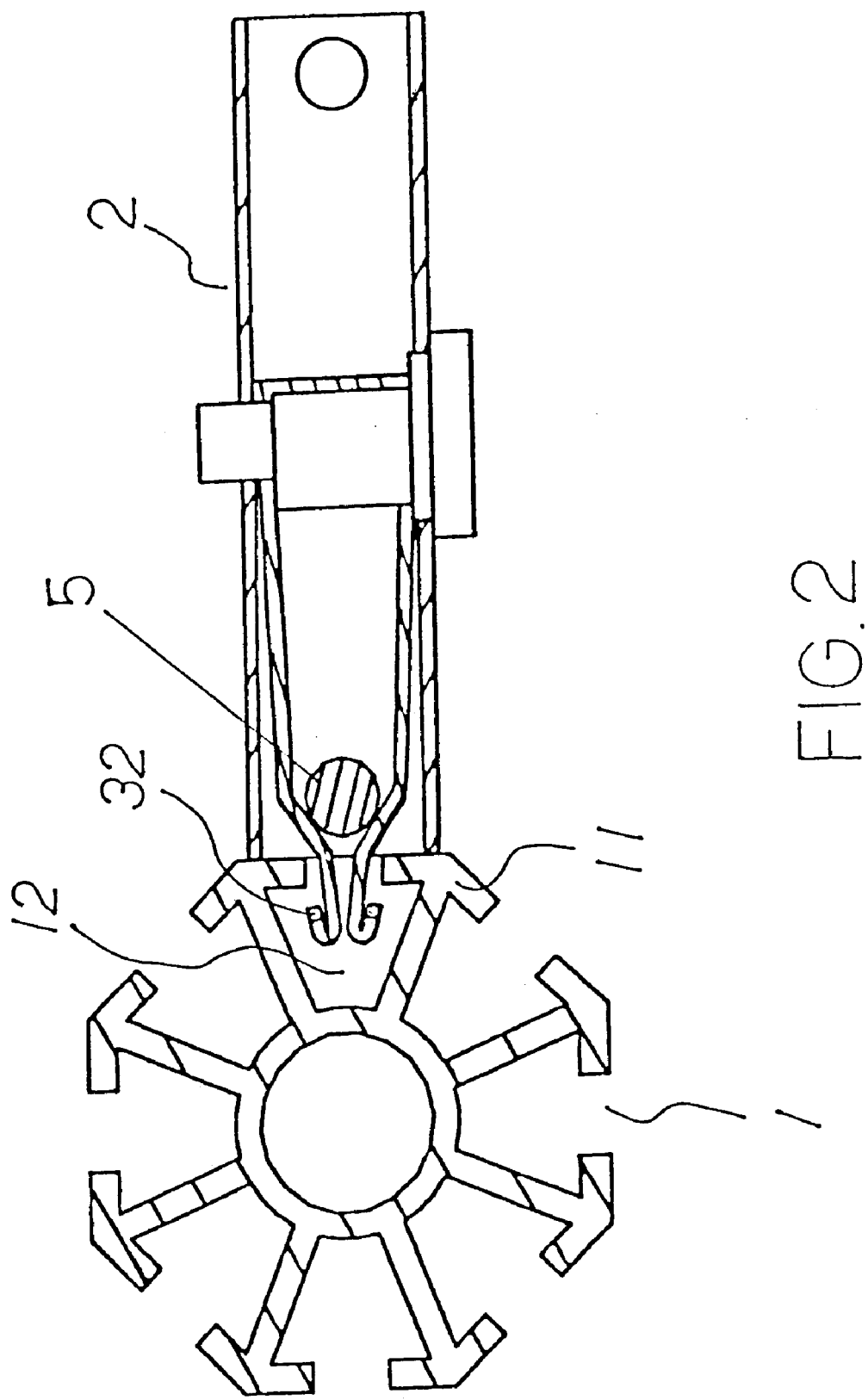
FIG. 2 shows the perspective diagram of the assembly of the connector with the supporting tubes (in the loosening state) according to the present invention.
Figure 3:
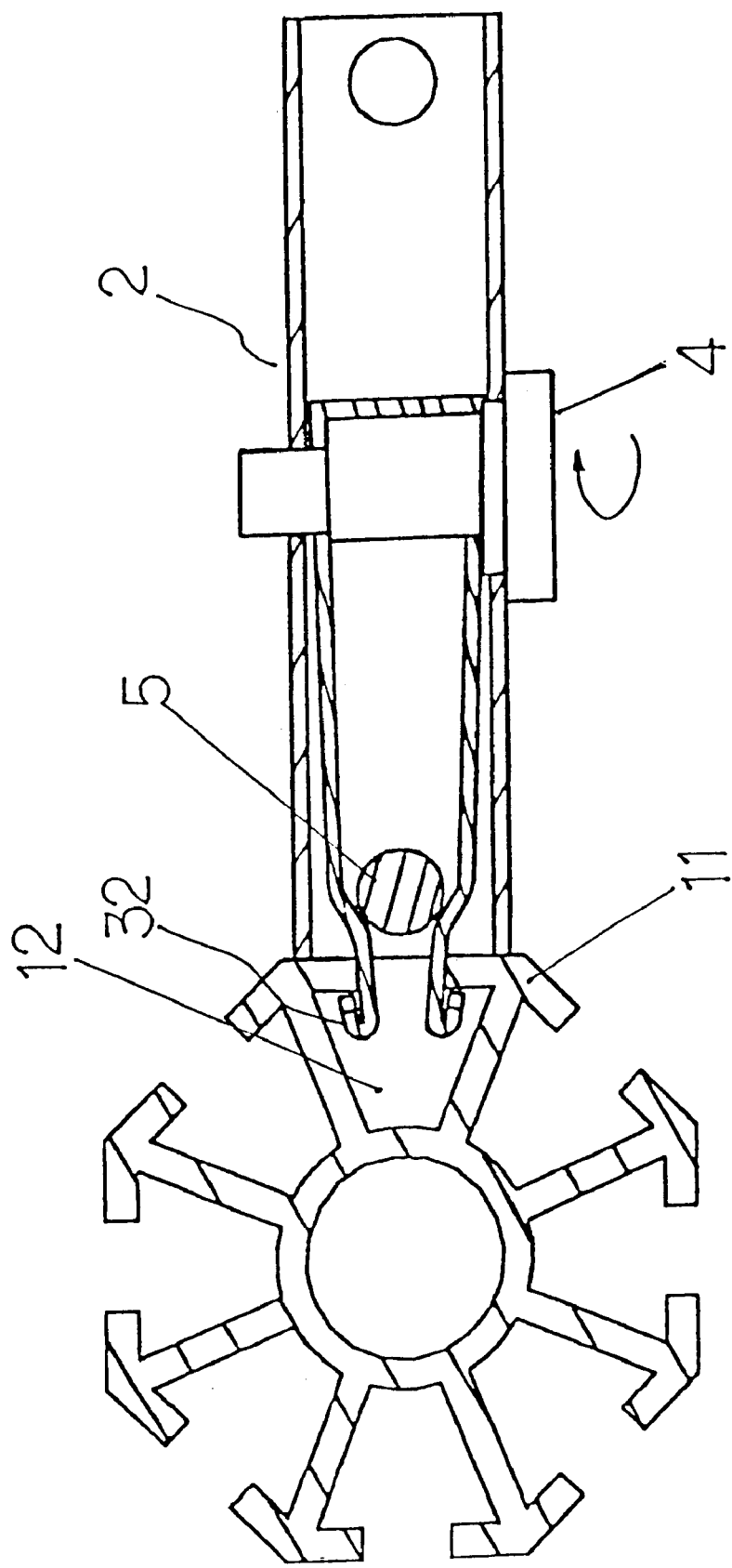
FIG. 3 shows the perspective diagram of the assembly of the connector with the supporting tubes (in the tightening state) according to the present invention.
Figure 4:
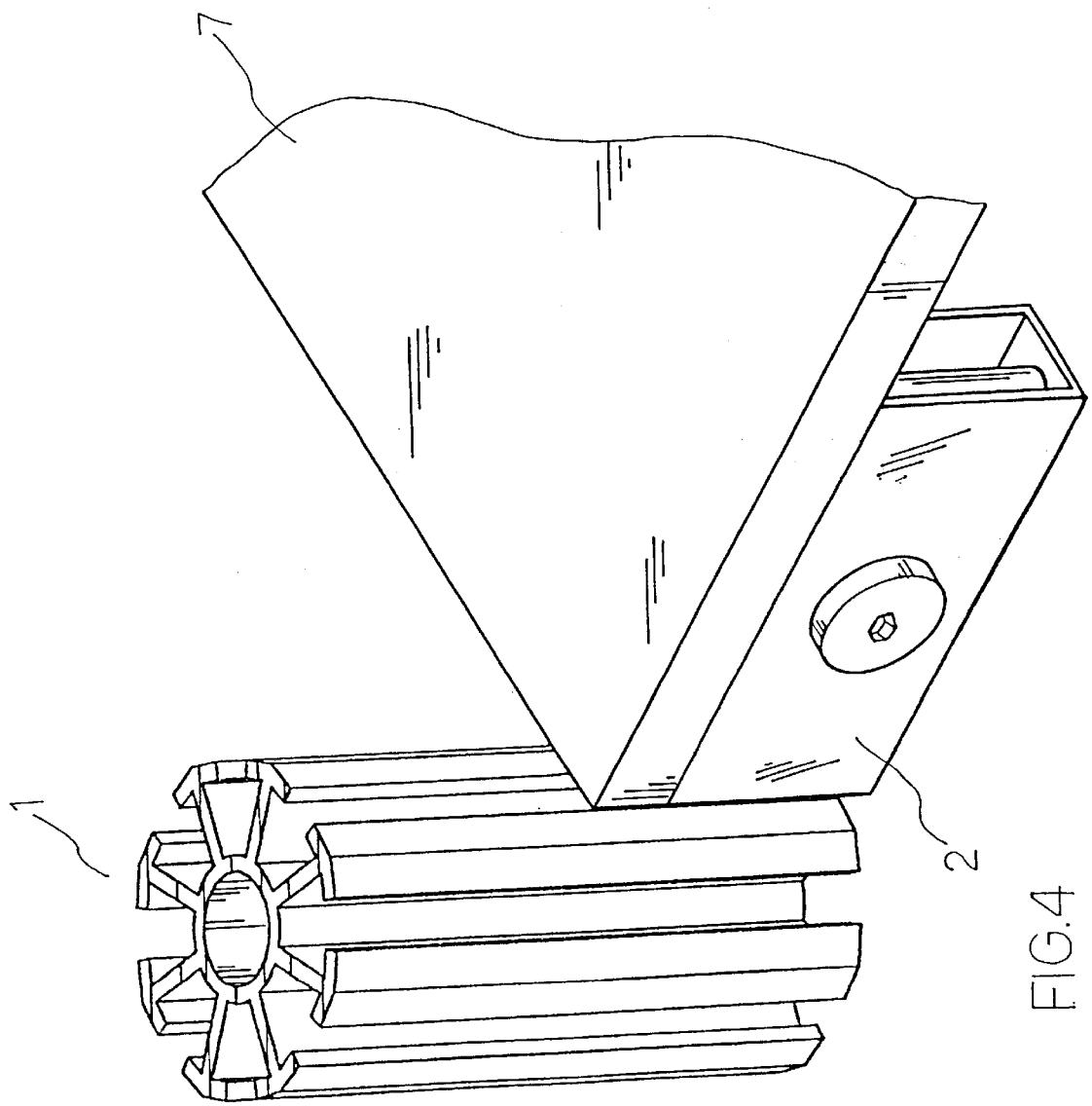
FIG. 4 shows the first embodiment of the present invention and partially illustrates in a three-dimensional diagram of the assembling of the knockdown furniture connector to the edge of the lower section of the layered rack.
Figure 5:
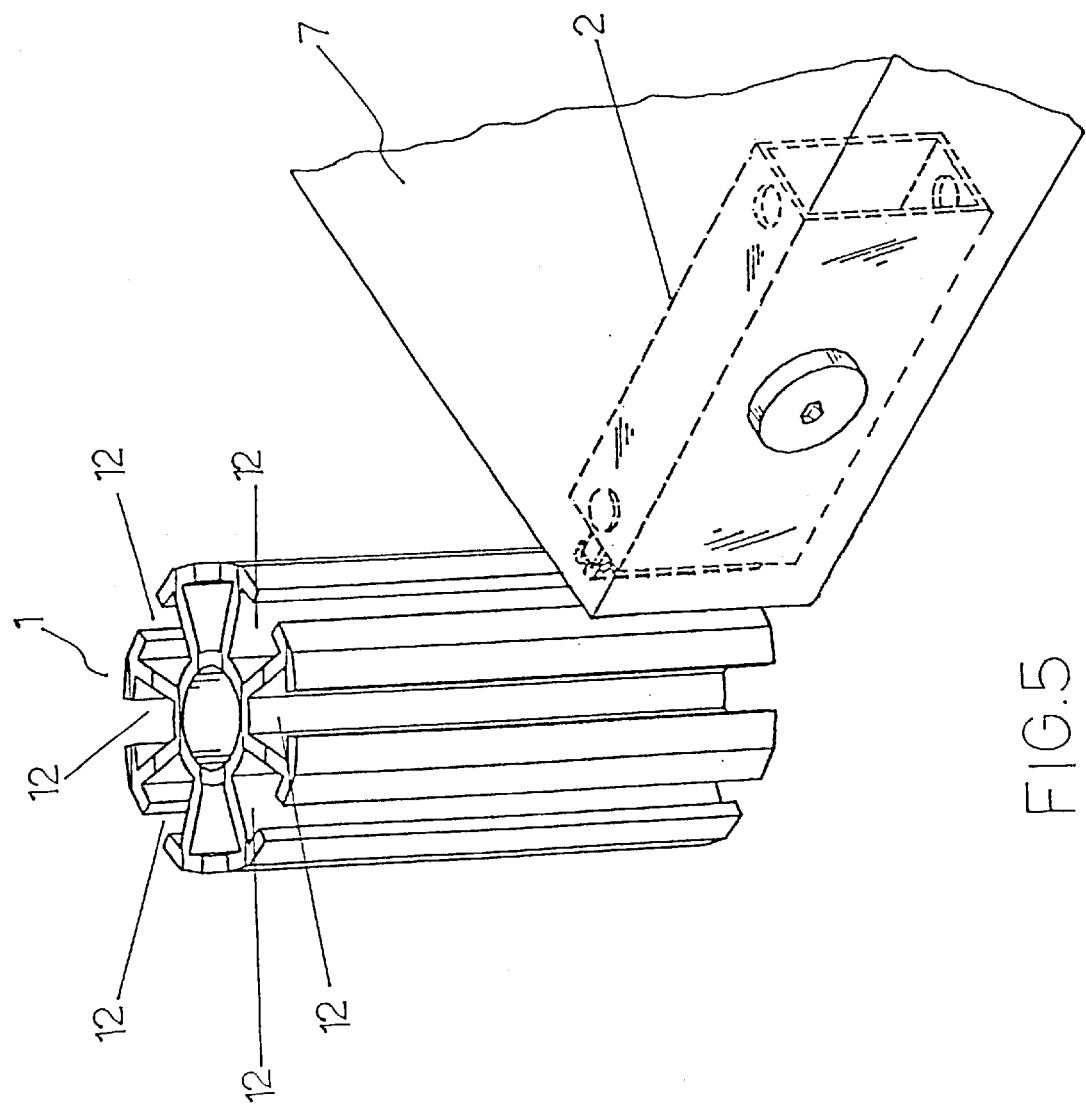
FIG. 5 shows the second embodiment of the present invention and partially illustrates the assembling of the knockdown connector directly into the internal portion of the layered rack.

Please refer to FIGS. 1 to 5 for the knockdown furniture connector 2 of the present invention. The framework of the knockdown furniture is composed of a predetermined number of tubes 1 and layer boards (racks) 7, connectors 2 and relevant accessories. The connector 2 is mounted to a fixed location on the layer board (rack), and usually is connected to the four corners; and such connector is fixed in position onto the tubes 1 of the framework. The tubes 1 are equidistant from each other forming a "T" shaped rib 11, and two of such corresponding T-shaped ribs 11 form a long groove 12; such connector 2 comprises a connecting block 6 which is hollow, and there is a guiding member 63 at the front end of the top surface of said connecting block for guiding the connector 21 into the long groove 12 of the tube 1 of the framework for the connection. There are apertures 61 both in the front end and in the rear end, wherein the aperture 61 at the front end is for riveting a rod 5 which further comprising a hole 62 on both lateral sides; a pressing bracket 3 inside the connecting block 6 has a diminishing opening 31 at its front end and the edge of the front end pivoted outward to form a suppressing surface 32; such suppressing surface 32 having a plurality of serrations 33 and having a hole 34 at the rear end; a locking member 4 having an eccentric axle 41, said eccentric axle 41 passes through the aperture 62 on the connecting block 6 and the hole 34 on the pressing bracket 3 all the way through to the bottom surface. The rear end 42 of said eccentric axle 41 passes through the right lateral side 64 of said connecting block 6 and then rivets the front end of the pressing bracket 3 to the connecting block 6; a rod 5 pivotally coupled to the hole 61 in the front end of the connecting block 6 and is deposed at the back end of the diminishing opening 31 of the pressing bracket 3; it finally composes a connector 2.

Such arrangement allows the user to pre-install the layer board (rack) 7 with the connector 2 first before the assembly of the furniture, or wait until the connector is installed onto the tubes 1 of the framework before assembling the knockdown furniture. During the assembly of the knockdown furniture, align the guiding member 63 with the long groove 12 of the tube 1 of the framework to guide the suppressing surface 32 at the front end of the pressing bracket 3 into the long groove 12 of the framework tube 1. Said guiding member 63 also acts as a stopper to prevent the tubes of the framework shaking from side to side during its assembly. Depending on the required height, use a wrench to rotate the locking member 4 and press the rear end 35 of the pressing bracket 3 by the eccentric axle 41 of the locking member 4. It makes the pressing bracket 3 moves backward and in turn makes the diminishing opening 31 at the front end of the pressing bracket 3 extends outwards due to the pressing by the rod 5, and further to have an occlusion with clipping member 13 at the rib surface of the long groove 12. Since there are serrations 33 on the suppressing surface, and such serrations give a more secure occlusion effect to the rib surface 13 of the framework tube after having the occlusion with the clipping member. It definitely meets the loading requirement and further can be securely mounted onto the framework tubes 1 for positioning and forms a structure of knockdown furniture. When there is a need to adjust the height of the layer broad (rack), the user only has to loose the locking member 4, which will separate serrations 33 on the suppressing surface 32 of the pressing bracket 3 from the rib surface 13 of the framework tube 1, and the user can freely adjust the height of the layer board 7. After the layer board is in position, the user can lock the locking member 4. Such arrangement does not only provide a simple and fast assembling for the knockdown furniture, it also gives a more convenient way to adjust the height of the layer board 7, and it is certainly a very practical connector for assembling knockdown furniture.

Figure 6:
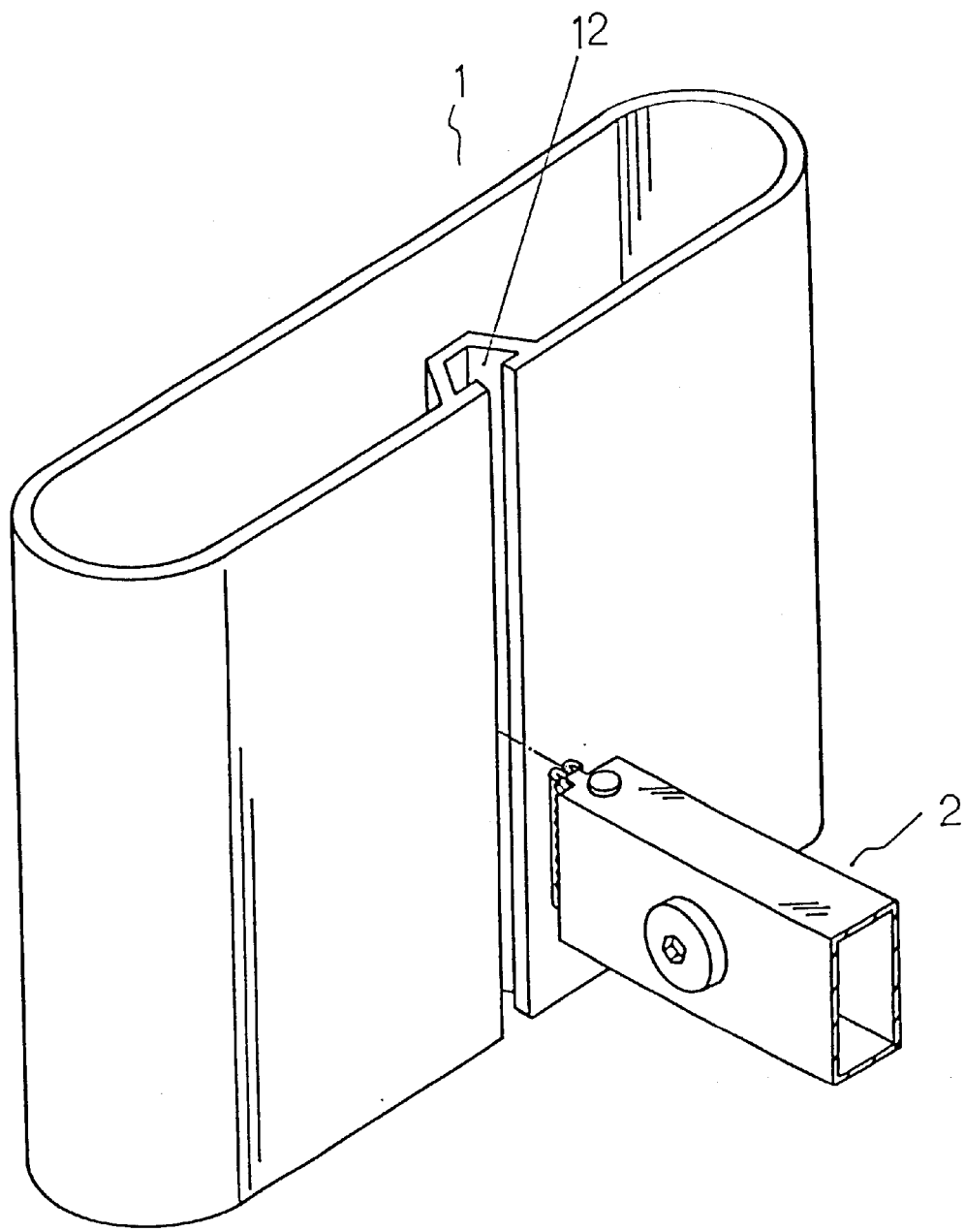
FIG. 6 shows the three-dimensional diagram of the structural look of the present invention and the first method of utilizing the supporting tubes of the rack (working with a single angled rectangular supporting tubes.)
Figure 7:
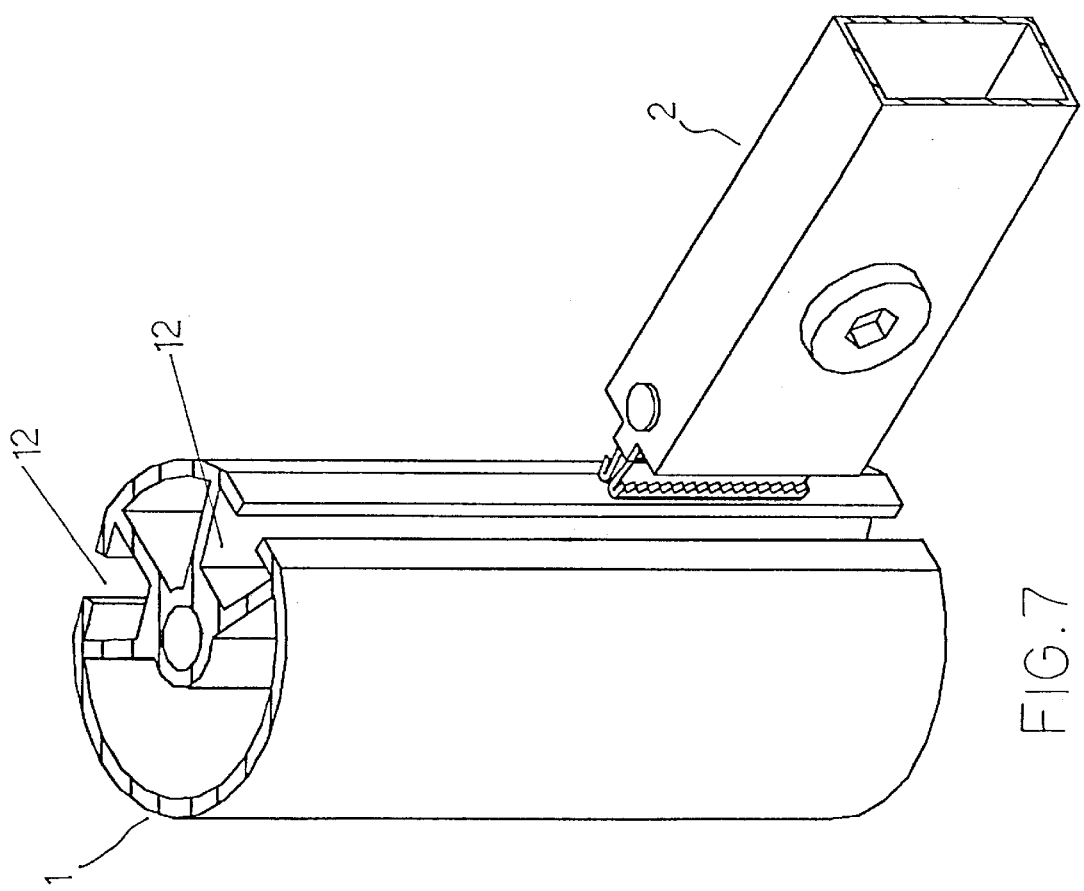
FIG. 7 shows the three-dimensional diagram of the structural look of the present invention and the second method of utilizing the supporting tubes of the rack (working with a supporting tube capable for a s right-angle rotation.)
Figure 8:
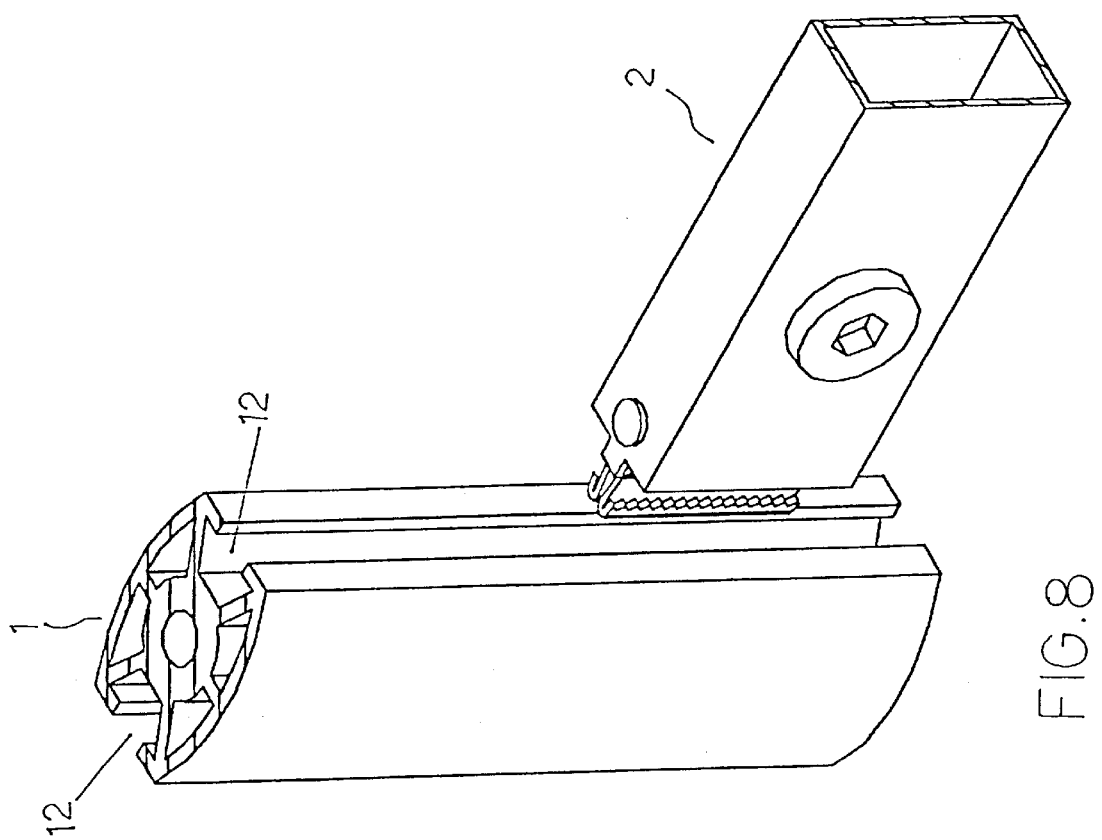
FIG. 8 shows the three-dimensional diagram of the structural look of the present invention and the third method of utilizing the supporting tubes of the rack (working with a 180 supporting tube capable for a 180-degree rotation.)
Figure 9:
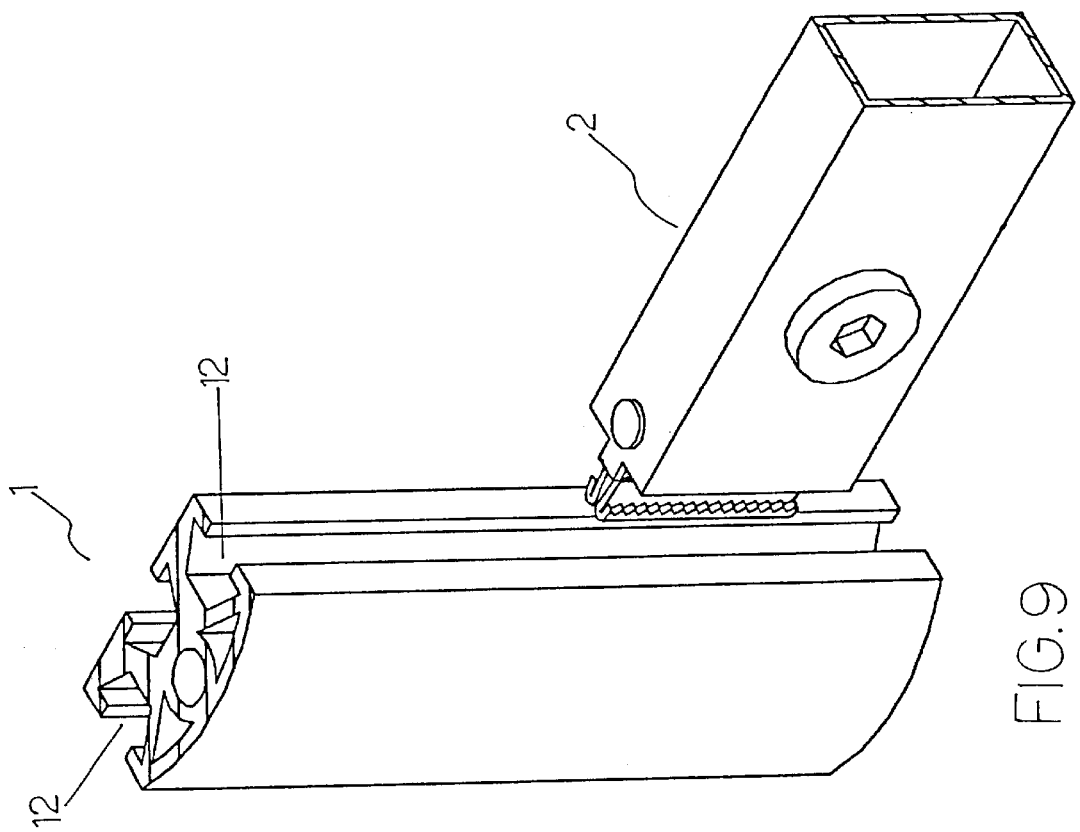
FIG. 9 shows the three-dimensional diagram of the structural look of the present invention and the fourth method of utilizing the supporting tubes of the rack (working with a supporting tube capable for either a right-angle or 180-degree rotation.)
Figure 10:
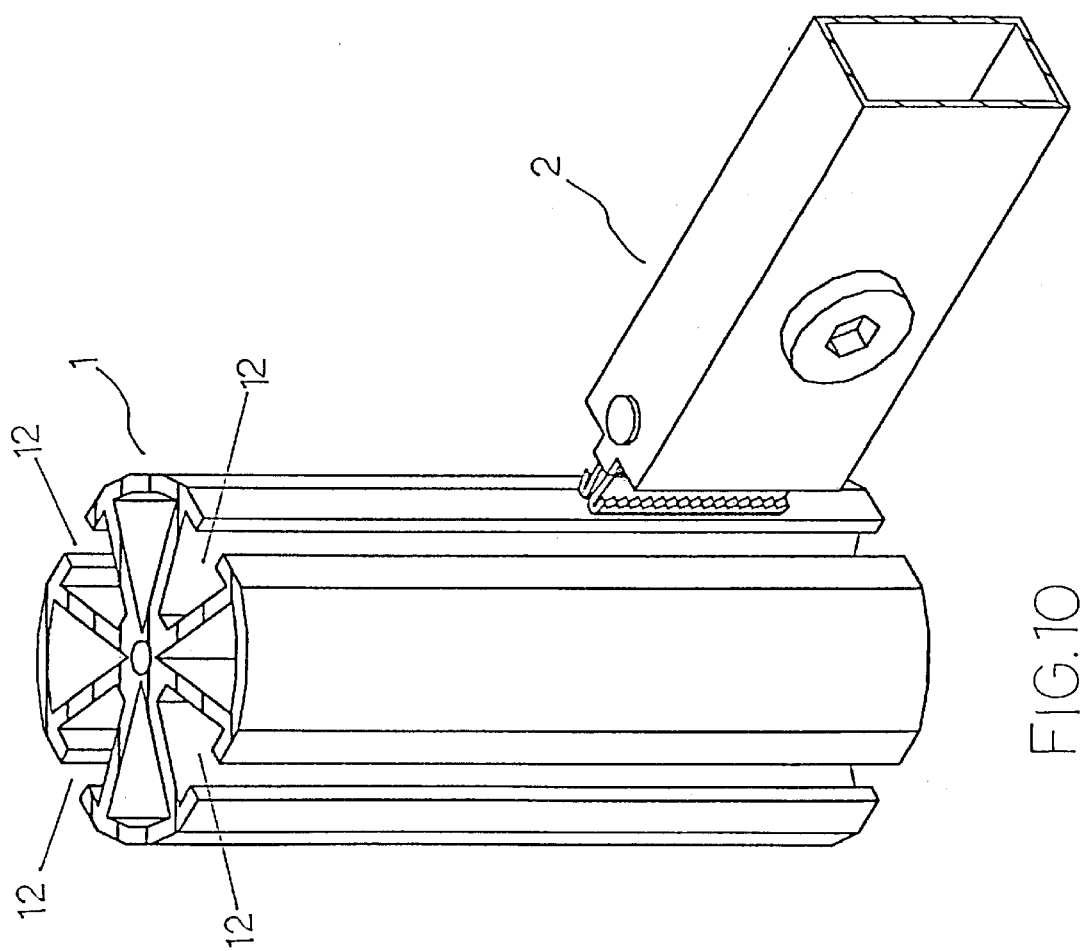
FIG. 10 shows the three-dimensional diagram of the structural look of the present invention and the fifth method of utilizing the supporting tubes of the rack (working with a supporting tube capable for a right-angle, 180-degree, 270-degree, or 360-degree rotation.)
Figure 11:
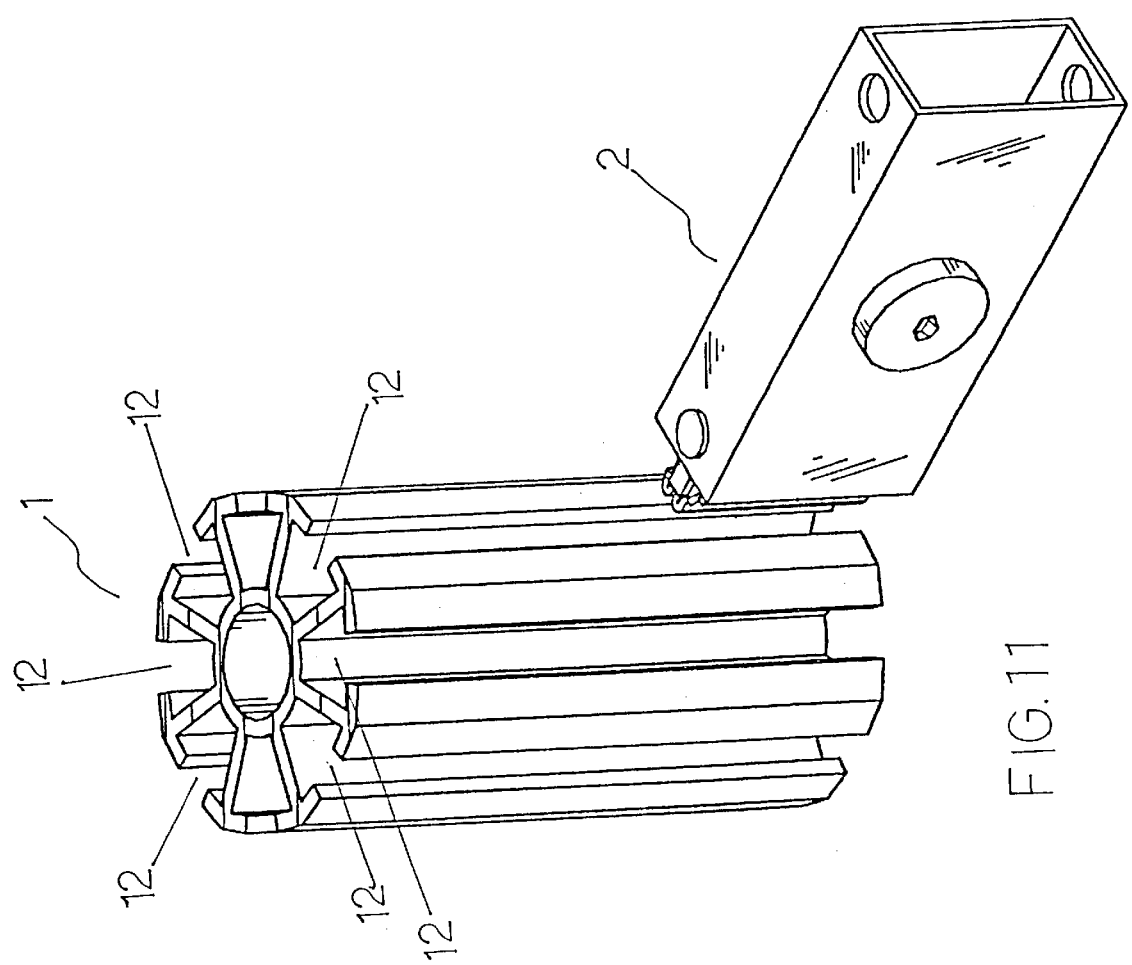
FIG. 11 shows the three-dimensional diagram of the structural look of the present invention and the sixth method of utilizing the supporting tubes of the rack (working with a supporting tube capable for a right-angle, 60-degree, 120-degree, 180-degree, 240-degree, 300-degree, 270-degree, or 360-degree rotation.)
Figure 12:
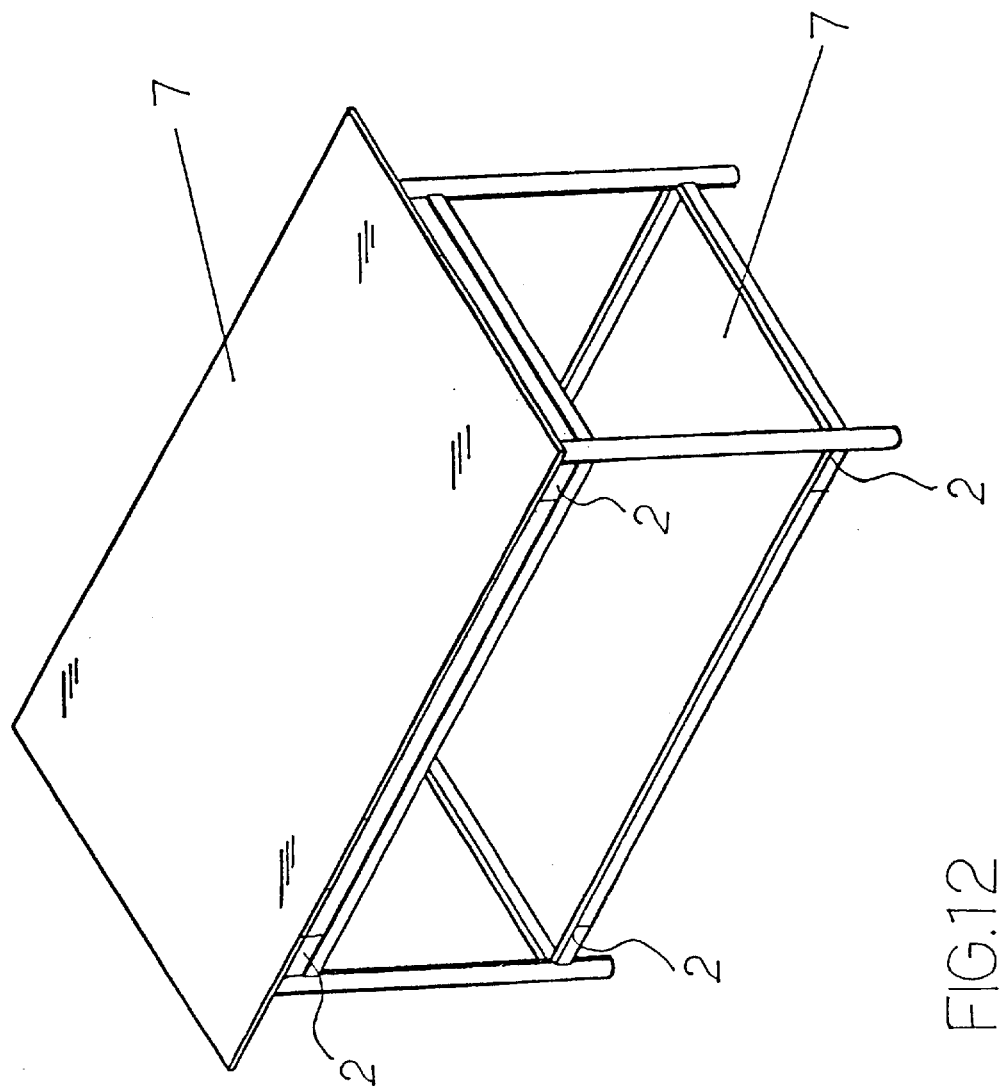
FIG. 12 shows the three-dimensional diagram of the assembly of the present invention with a single layer rack.
Figure 13:
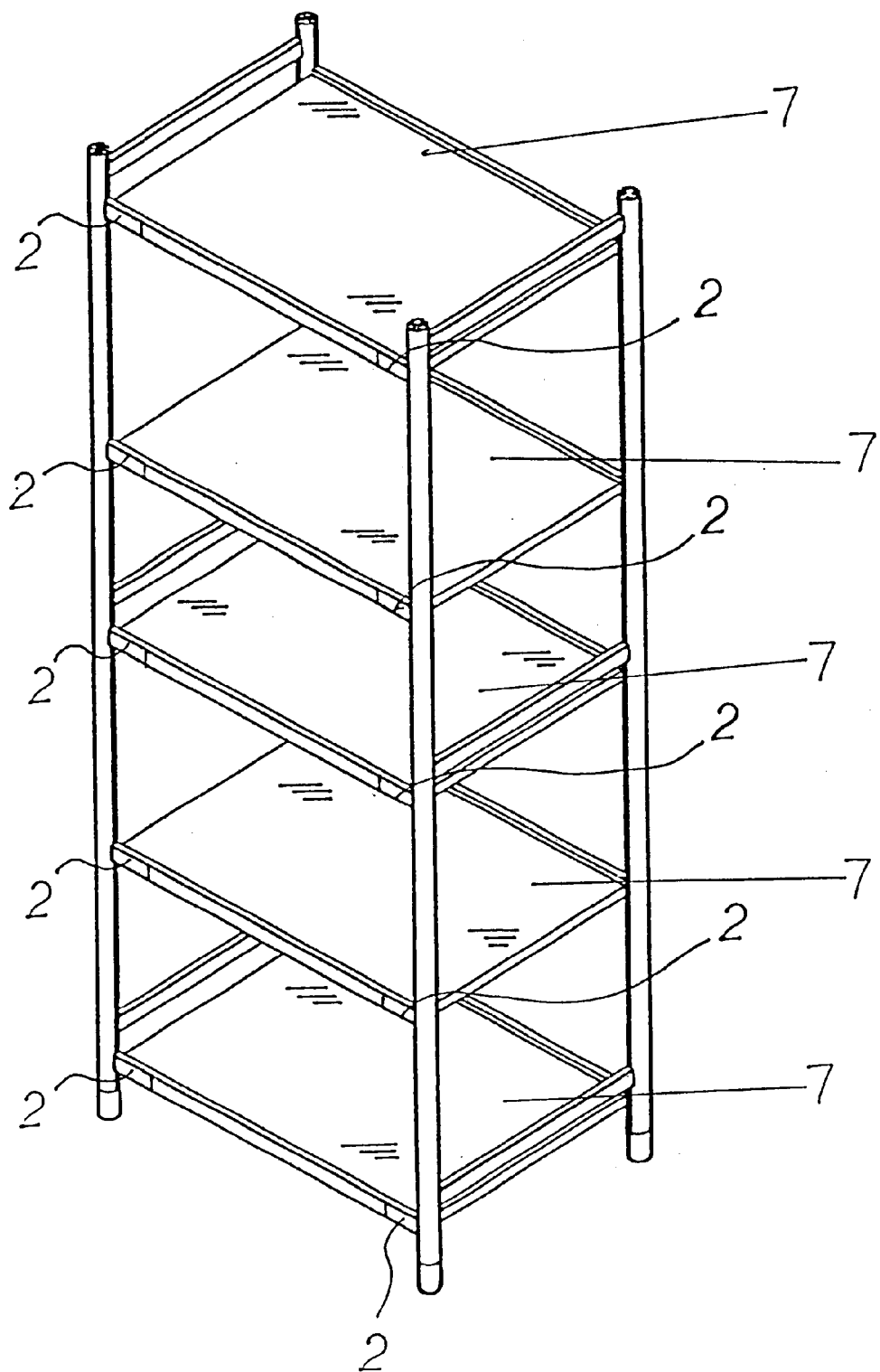
FIG. 13 shows the three-dimensional diagram of the assembly of the present invention with a double (or multiple) layer rack.

Please refer to FIGS. 6 to 13 for the assembling of the knockdown furniture with the connector 2 to various framework tubes 1 at different angles and different number of long grooves.

In view of the descriptions above, the present invention is innovative and more advantageous than the conventional prior art and complies with the patent application requirement. Hence the present invention is submitted to the Patent and Trademark Office for review and the granting of the commensurate patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A knockdown furniture connector, comprising:

a hollow connecting block having an open face, an aperture in a wall and at a front end thereof, and further having holes in lateral sides thereof;

a pressing bracket disposed in the hollow connecting block and projecting out of the open face, said pressing bracket having two opposing legs joined together at a rear end of said pressing bracket, each of said opposing legs having a free end at a front end of said pressing bracket, each free end being bent outward, said pressing bracket further having a hole at the rear end thereof;

a locking member having an eccentric axle which passes through the holes in the lateral sides of the connecting block and the hole in the pressing bracket to fix said pressing bracket to said connecting block, said locking member being turnable within the holes in the lateral sides of the connecting block and the hole in the pressing bracket; and a rod fixed within the aperture at the front end of said connecting block, said rod passing between said opposing legs and being disposed in front of said locking member and behind the free ends of said pressing bracket;

wherein when said locking member is turned, the eccentric axle moves said pressing bracket rearward relative to said connecting block and to said rod, so that said rod engages said opposing legs and causes said opposing legs to spread and move away from each other.

2. The connector recited in claim 1, wherein each free end of each said leg has a plurality of serrations for a secure mounting.

3. The connector recited in claim 1, wherein the front end of said pressing bracket has a diminishing opening.

4. The connector recited in claim 1, wherein the front end at a top surface of said connecting block has a guiding trace for guiding the connector into a long groove on a tube of a frame for connection.

* * * * *